United States Patent [19]
Kampf

[11] 3,916,491
[45] Nov. 4, 1975

[54] TENTER CLIP MACHINE FOR BIAXIALLY STRETCHING THERMOPLASTIC FILM

[75] Inventor: Herbert Kampf, Wiehl, Germany

[73] Assignee: Firma Erwin Kampf Maschinenfabrik, Wiehl, Germany

[22] Filed: Mar. 22, 1974

[21] Appl. No.: 453,614

[30] Foreign Application Priority Data
Mar. 23, 1973 Germany.......................... 2314533

[52] U.S. Cl. ................. 26/57 R; 425/66; 26/61 B
[51] Int. Cl.² .......................................... D06C 3/00
[58] Field of Search .................. 26/54, 57 R, 61 B; 264/289; 425/66

[56] References Cited
UNITED STATES PATENTS
2,618,012  11/1952  Milne ................................. 264/289
3,427,684  2/1969  Tsien ................................ 26/57 B X

*Primary Examiner*—Robert R. Mackey
*Attorney, Agent, or Firm*—Allison C. Collard

[57] ABSTRACT

A tenter clip type stretching machine for receiving and gripping thermoplastic films in an entering section having spaced apart tenter clips successively arranged along a processing section at each side of the film. The clips are each provided with a gap to retain a section of the marginal edge of the film, and a feeder means is disposed adjacent to the entering section for dispensing a channel-shaped edge cover strip into the gap of each tenter clip of the processing section so that the cover strip encompasses the respective marginal edge of the film as the tenter clip is ready to grip the film. The apparatus also includes a payoff device for receiving a supply spool to contain the cover strip, and a foldover device for folding the cover strip so that it has a channel configuration whereby the two legs of the channel protrude over the film edge. A registration means is also provided inside the feeder to align the cover strip between the gaps of the tenter clips. The cover strip is also subdivided into a plurality of individual sections by transversely extending perforations.

3 Claims, 3 Drawing Figures

TENTER CLIP MACHINE FOR BIAXIALLY STRETCHING THERMOPLASTIC FILM

The present invention relates to a tenter cliptype stretching machine for thermoplastic films comprising tenter clips successively arranged along a processing section at either side thereof which (tenter clips) are provided with a gap to retain a section of the film marginal edge.

Clip type stretching machines of this type are known in the art as transverse and simultaneous biaxial stretching units. The thermoplastic films to be processed are heated to temperatures immediately below the fusion range inside the processing section. Sometimes in this processing stage, the film sticks to the tenter clips. This risk is particularly great in the case of a laminated film of the type in which the top layers exhibit a lower fusion range than the substrate. It is also possible that the top layers are in molten state as the substrate reaches stretching temperature, so that the film marginal edges become bonded to the tenter clips thus causing contamination thereof. Film residues also may be left sticking to the clips. This type of contamination of the tenter clips renders the machine unusable so that cleaning would be required. This results in undesirable interruptions and downtimes.

The problem underlying the present invention is to provide a tenter clip type stretching machine which is capable of properly processing thermoplastic films that comprise top or surface layers tending to be sticky or to become bonded to the clip metal at the processing temperature involved.

According to the invention this problem is solved in that in the input to the processing section, there is, for each tenter clip row provided, a feeder means for entering a channel-shaped marginal edge cover strip into the gap of each tenter clip. The clips are in a condition ready to grip, so that the cover strip encompasses the respective marginal edge of the film. Of course, the cover strip has to have properties that would prevent it from sticking at least to the material of the tenter clips at the working temperature of the tenter clip type stretching machine.

The simplest type of marginal edge cover strip is a strip of paper which after pleating, would be pushed over the film longitudinal edge and clamped fast in the gap of each tenter clip. Accordingly, the tenter clip only has direct contact with the marginal edge cover strip rather than with the surface of the film as such, so that the film and/or the film surface and/or the top layer thereof cannot reasonably stick to the tenter clips. The cover strip may well be allowed to adhere to the marginal edge of the film because it will be removed in the subsequent process of sidetrimming the film and/or laminated structure, a step which is necessary.

The marginal edge cover strip is perforated transversely at spacings equal to the distance between the tenter clips and will be introduced into the clips so as to be in registration, so that each tenter clip receives and retains a cover strip section intermediately of two adjacent perforations. This is a feature of importance particularly for simultaneous biaxial stretching machines, to permit the cover strip to tear off along the perforations as the tenter clips move apart in a longitudinal sense.

Other objects and features of the present invention will become apparent from the following detailed description considered in connection with the accompanying drawings which disclose one embodiment of the present invention. It should be understood, however, that the drawings are designed for the purpose of illustration only and not as a definition of the limits of the invention to which reference should be made to the appended claims.

In the drawings wherein similar reference characters denote similar elements throughout the several views.

Figure 1:
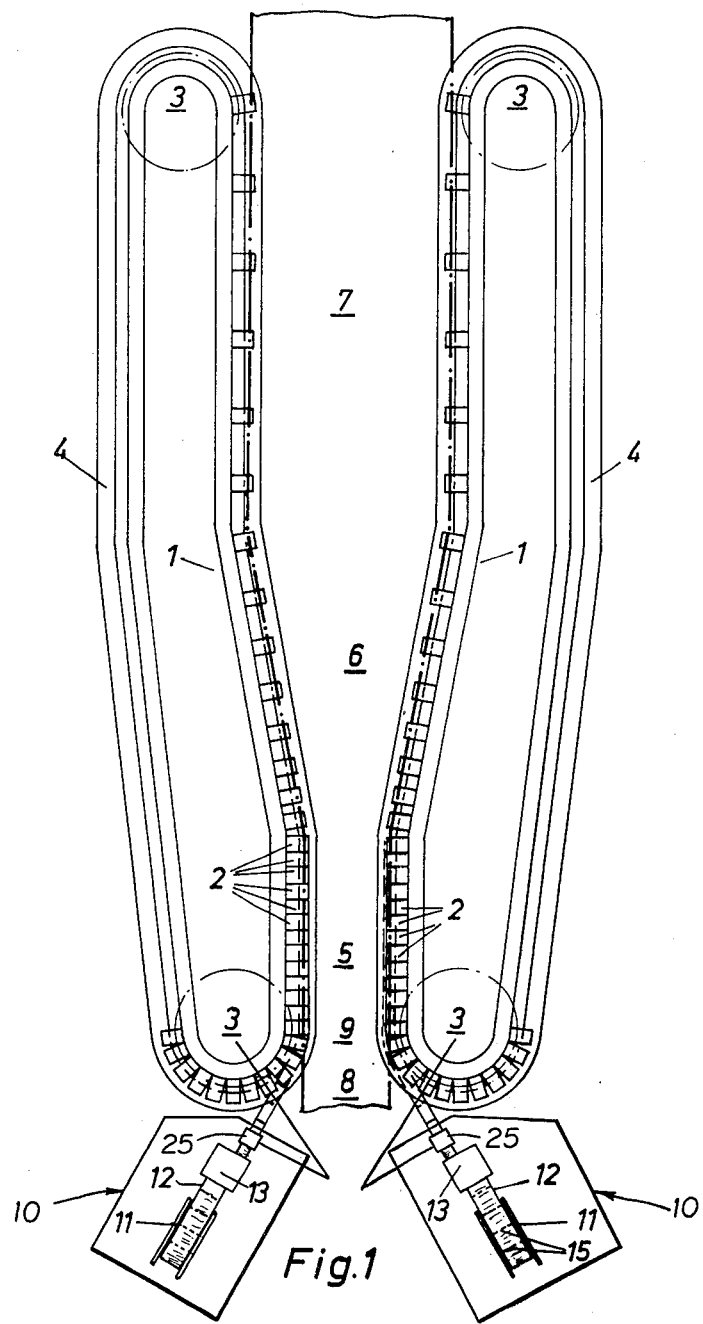
FIG. 1 is a schematic view of a tenter clip-type stretching machine according to the present invention.

The schematic general view according to FIG. 1 shows a simultaneous biaxial stretching machine. Guidetracks 1 for tenter clips 2 are disposed at either side of a central processing section. Tenter clips 2 are changed over to return tracks 4 by means of reversing guide means 3 so that the clips are in continuous recirculation at both sides of the processing section. The processing section is broken down into a heating section 5, a stretching section 6, and a setting section 7. The tenter clips are positively driven, and the drive may be accomplished by any suitable means such as roller chains, transmission belts, spindles, open link chains, sprocket chains and the like. This drive equipment will be designed and arranged in such a way that the spacing between successive tenter clips 2 remains uniformly small within the heating section 5, so that the clips are virtually in intimate contact with each other. Within stretching section 6, the distance between successive tenter clips would augment continually. The spacing between the clips in a conveying sense would finally be maintained constant at a large value within the setting section 7. The equipment needed for guiding and moving the tenter clips are not part of the present invention and therefore will not be described in detail herein. A thermoplastic film 9 is fed to the tenter clip type stretching machine within the entering section 8 thereof and gripped along its marginal edges by the tenter clips of each clip row. The clips reach the entering section 8 on the reversing guides 3 with their gaps open and automatically close their gaps or jaws by means of suitable guides as they contact the marginal edges of the film.

There is one feeder means 10 provided in the entering section 8 of the processing line for each row of tenter clips. Feeder means 10 is shown in schematic representation only in FIG. 1 and comprises a payoff device (not shown) adapted to receive a spool 11 with a supply of strip 12 and a succeeding foldover device 13 to form the strip into a marginal edge cover strip 14 of channel configuration by longitudinal pleating thereof. The marginal edge cover strip 14 is preferably of paper. The open side of the channel faces the central processing section. The marginal edge cover strip 14 moves into the entering section 8 to between the open gap of each open tenter clip, and as it does, is pushed over the film marginal edge. As the tenter clip closes, the marginal edge cover strip 14 would be clamped fast and between said strip the respective film edge.

Strip 12 is provided with transversely extending perforations 15 whose spacings are substantially equal to the distances between the clips. A registering means 25 (for example, O'Toole U.S. Pat. No. 3,370,768) scans perforations 15 or special marks and ensures that perforations 15 become in each case disposed in the area between two successive clips.

Figure 3:
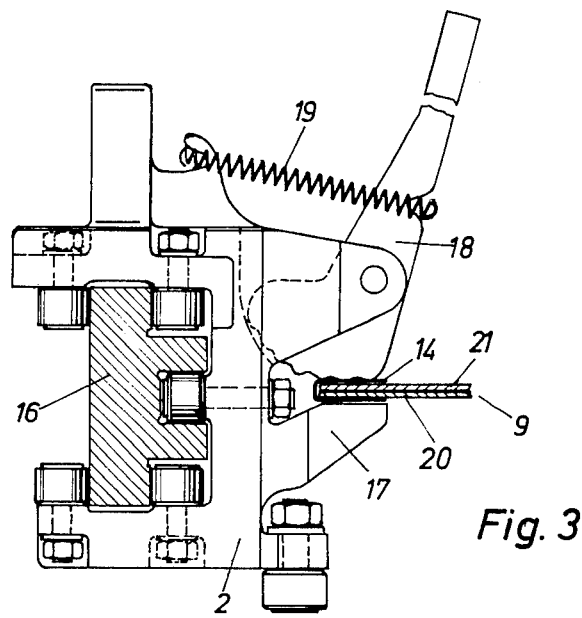
FIG. 3 is a plan view of FIG. 2.
Figure 2:
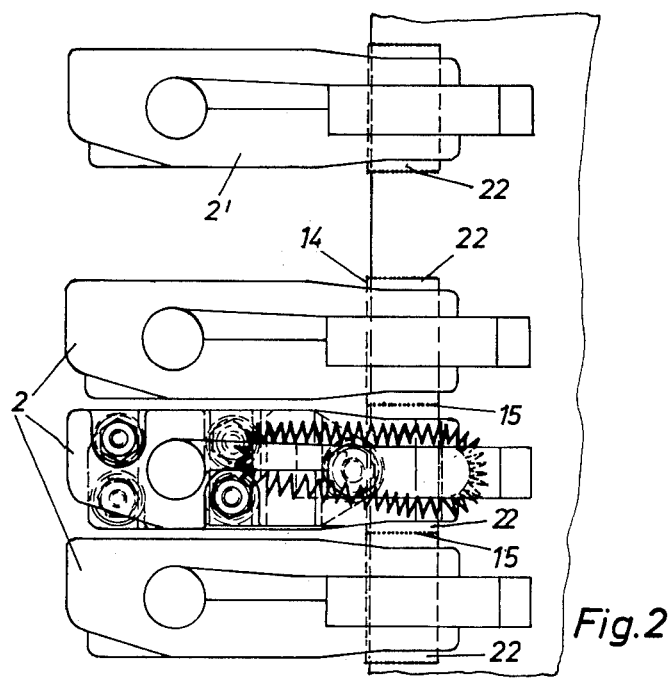
FIG. 2 is a cutaway view, drawn to larger scale, from a row of tenter clips along one of the marginal edges of the film.

This can best be seen froms FIGS. 2 and 3 which show tenter clips 2 in a specific arrangement. The clips are moved on a guide rail 16 by means of rollers. The mouth or gap of each clip is located between a supporting arm member 17 and a cocking lever 18 which is tensioned under the action of a spring 19. The marginal edge of the thermoplastic film 9 is clamped intermediately of the jaws of the tenter clip with the edge cover strip 14 encompassing the marginal edge. The drawing shows a thermoplastic film 9 composed of two layers which comprise for instance, a substrate 20 of polypropylene and a top layer 21 of polyethylene. Polyamide-polyethylene or polyester-polyethylene layer formations are likewise feasible. Different laminated structures may also be processed, for films where the top layers exhibit lower strengths, lower fusion indices and/or smaller fusion ranges than the substrates. Composite films may comprise coextruded or fusion coated sheeting.

The tenter clip transport means are not shown. According to FIG. 2, tenter clips 2 are substantially in a direct contact when applied to entering section 8 and heating section 5. In this arrangement, each of the tenter clips occupies one part length 22 intermediately of two perforations of the marginal edge cover strip 14, which means that perforations 15 between successive part lengths 22 are disposed distinctly between the clips. The previously mentioned registering means directly scans the perforations or special marks. FIG. 2 also indicates by way of schematic representation within the stretching section 6, how the spacing between successive tenter clips increases. It can be seen, for instance, that clip 2' is a greater distance away from its adjacent clip 2. This increase in spacing causes the strip to tear off along its perforations so as to part the individual part lengths 22 of the marginal edge cover strip 14.

While the figures show a simultaneous biaxial stretching machine, it will be understood that the present invention is also applicable to a transverse stretching machine.

While only a single embodiment of the present invention has been shown and described, it will be obvious to those skilled in the art that many changes and modifications may be made thereunto without departing from the spirit and scope of the invention.

What is claimed is:

1. In a tenter clip type stretching machine for receiving and gripping thermoplastic film in an entering section having spaced-apart tenter clips successively arranged along a processing section at either side thereof, said clips each being provided with a gap to retain a section of the marginal edge of the film, means for advancing said tenter clips and for increasing the spacing therebetween in a longitudinal direction with respect to said film, guide path means for said tenter clips for transversely stretching said film which is retained by said tenter clips by movement of the latter on said guide path means, the improvement comprising:

feeder means disposed adjacent to the entering section and including a payoff device receiving a supply spool for containing a cover strip, said feeder means for dispensing a channel-shaped edge cover strip having two legs into the gap of each tenter clip of a processing section so that the cover strip encompasses the respective marginal edge of the film with the two legs protruding over said respective film marginal edge of the film, as the tenter clip is ready to grip the film; and means for closing said tenter clips for gripping said film and cover strip after placement thereon.

2. The tenter clip type stretching machine according to claim 1 wherein each said feeder means further comprises a foldover switch for longitudinally folding the cover strip into said channel-shaped edge cover strip with said two legs.

3. The tenter clip type stretching machine according to claim 2 wherein said cover strip has transverse perforations, the stretching machine further comprising registering means disposed inside each said feeder means for scanning said perforations and for feeding the cover strip so that said perforations are disposed between (the gaps of the) two successive tenter clips for said gripping.

* * * * *